US006274838B1

(12) United States Patent
Demers et al.

(10) Patent No.: US 6,274,838 B1
(45) Date of Patent: Aug. 14, 2001

(54) MULTI-PURPOSE, MULTI-TRANSFER, MULTI-POSITION SHIELDING GAS FOR ARC WELDING

(75) Inventors: Claude Raymond Demers, Ville LeMoyne; Guy LeHouillier, Drummondville, both of (CA)

(73) Assignee: Air Products and Chemicals Inc., Allentown, PA (US)

( * ) Notice: Subject to any disclaimer, the term of this patent is extended or adjusted under 35 U.S.C. 154(b) by 0 days.

(21) Appl. No.: 09/284,558

(22) PCT Filed: Dec. 5, 1997

(86) PCT No.: PCT/US97/22337

§ 371 Date: Jun. 30, 1999

§ 102(e) Date: Jun. 30, 1999

(87) PCT Pub. No.: WO99/27798

PCT Pub. Date: Jun. 10, 1999

(51) Int. Cl.$^7$ ............................................... B23K 9/173
(52) U.S. Cl. ......................................... 219/74; 219/137 R
(58) Field of Search .......................... 219/74, 75, 137 R

(56) References Cited

U.S. PATENT DOCUMENTS

| 3,496,323 | 2/1970 | Lesnewish et al. . | |
|---|---|---|---|
| 4,749,841 | 6/1988 | Galantino et al. . | |
| 4,857,692 | * 8/1989 | Larson et al. | 219/74 |
| 4,871,898 | 10/1989 | Cherne et al. . | |
| 4,902,866 | * 2/1990 | Galantino | 219/74 |
| 4,973,822 | * 11/1990 | Evans et al. | 219/74 |
| 4,999,474 | * 3/1991 | Schultz et al. | 219/74 |
| 5,313,039 | * 5/1994 | Harvey et al. | 219/74 |
| 5,432,317 | * 7/1995 | Church | 219/137 PS |

FOREIGN PATENT DOCUMENTS

| 0584000A1 | 2/1994 | (EP) . |
| 2235576 | 9/1990 | (JP) . |

OTHER PUBLICATIONS

Dilthey, U., "Schutzgase Zum Magm–Hochleistungsschweissen", Schweissen Und Schneiden, vol. 47, No. 2, Feb. 1, 1995, pp. 118–123, XP000493509.

International Search Report (PCT/US97/22337), mailed Aug. 28, 1998, 5 pp.

* cited by examiner

Primary Examiner—Clifford C. Shaw
(74) Attorney, Agent, or Firm—Ratner & Prestia

(57) ABSTRACT

A shielding gas composition and method of using the shielding gas in gas metal arc welding or flux cored are welding, or composite cored arc welding. The gas is a mixture of argon, helium and carbon dioxide blended to facilitate metal transfer in any position for all the named processes.

3 Claims, No Drawings

MULTI-PURPOSE, MULTI-TRANSFER, MULTI-POSITION SHIELDING GAS FOR ARC WELDING

CROSS REFERENCE TO RELATED APPLICATION

Not applicable

STATEMENT REGARDING FEDERALLY SPONSORED RESEARCH OR DEVELOPMENT

Not applicable

BACKGROUND OF THE INVENTION

This invention relates to gas metal arc welding, flux cored arc welding, and composite cored arc welding, and in particular to a shielding gas composition for use in these processes.

It is well known in the welding art that in shielded metal arc welding, gas metal arc welding, flux cored arc welding, and composite cored arc welding, the shielding gas can affect the process and the quality of the resulting weld.

In these processes it has been common practice to employ a shielding gas which has as its main ingredient argon, an inert gas. Blended into the argon are various mixtures of other gases selected from the group consisting of oxygen, carbon dioxide, and helium. A detailed explanation of shielding gases can be found in publication ANSI/AWS C5.10-94 published by the American Welding Society under the title "Recommended Practices For Shielding Gases For Welding And Plasma Arc Cutting".

The underlying welding processes, in particular gas metal arc welding (GMAW) and flux cored arc welding (FCAW) are explained in detail in volume 2 of the eighth edition of the welding hand book, chapters 4 and 5 respectively, published by the American Welding Society.

According to the Welding Handbook various shielding gas mixtures having been employed in the welding processes that basically combine transfer of metal from a consumable electrode, be it a stick electrode or continuous wire, to a weld pool to create a joint between prepared base metals to be joined.

The gas metal arc welding (GMAW) process is an arc welding process that uses an arc struck between a continuous filler metal electrode and the weld pool. The process is used with shielding supplied by a gas mixture without the application of pressure. The shielding gas mixtures are basically argon with one or more addatives such as oxygen, carbon dioxide, helium or hydrogen.

The flux cored arc welding (FCAW) process involves an arc between a continuous filler metal electrode and the weld pool. The process is used with shielding from a flux contained within the tubular electrode, with or without additional shielding from an externally supplied gas, and without the application of pressure. In the case of flux cored arc welding using external shielding gases, the shielding gases are basically argon with one or more components selected from the group consisting of helium, oxygen and carbon dioxide.

Composite cored arc welding(CCAW) is used to describe an arc welding process where a tublar wire having a center filled with metal powder is used as the electrode material. This process also relies on the use of shielding gases to protect the arc and weld pool.

The various industrial gas suppliers and welding supply manufacturers offer numerous shielding gas mixtures.

In particular Air Products and Chemicals, Inc. has marketed a gas mixture called Astec HP for high deposition of metal and high arc travel speed in the gas metal arc welding process in the flat or horizontal position. The composition offered by this company contains 65% argon 25% helium and 10% carbon dioxide. This particular shielding gas mixture makes it difficult to control the molten metal while welding in positions other than the flat or horizontal position. Furthermore, fine short circuit arc transfer is not easily effected with this mixture.

BRIEF SUMMARY OF THE INVENTION

It has been discovered that a gas mixture containing, by volume, 62–74% argon, 17–23% helium and 9–16% carbon dioxide can satisfy the long felt need to have a single shielding gas mixture that can be used with gas metal arc welding, flux cored arc welding, and composite cored arc welding in any mode of metal transfer and in any welding position. In a preferred embodiment the shielding gas contains 68% argon, 20% helium and 12% carbon dioxide by volume.

Therefore, in one aspect the present invention is a shielding gas mixture for arc welding consisting essentially of 62–74% by volume argon, 17–23% by volume helium and 9–16% by volume carbon dioxide.

In another aspect, the present invention is a gas metal arc welding process wherein an arc is maintained between a continuous filler metal electrode and a weld pool with shielding of the arc generated between the filler metal and the weld pool with a gas mixture of 68% by volume argon, 20% by volume helium, and 12% by volume carbon dioxide.

In yet another aspect, the present invention is a flux cored arc welding process wherein an arc is maintained between a continuous filler metal electrode consisting essentially of a metal enclosing fluxing materials and a weld pool with shielding of the arc with a gas mixture consisting essentially of 68% by volume argon, 20% by volume helium and 12% by volume carbon dioxide.

In still another aspect, the present invention is a composite cored arc welding process wherein an arc is maintained between a filler metal electrode and a weld pool with shielding of the arc with a gas mixture consisting essentially of 68% by volume argon, 20% by volume helium and 12% by volume carbon dioxide.

The present invention also pertains to a gas metal arc welding process wherein metal is transferred from an electrode by one of short circuiting transfer, globular transfer, spray transfer, pulsed spray transfer, high current density spray transfer, high current density rotational spray transfer or high current density non-rotational spray transfer and wherein a shielding gas consisting essentially of, by volume, 68% argon, 20% helium and 12% carbon dioxide is used to shield the arc generated during the process.

DETAILED DESCRIPTION OF THE INVENTION

As is well known in the art it is conventional for users of various welding processes such as gas metal arc welding (GMAW), flux cored arc welding (FCAW), and composite cored arc welding (CCAW) to require and have on hand different gas mixtures for the shielding required to utilize these processes to produce acceptable welds.

The present invention is centered around efforts to create a shielding gas mixture and use of the shielding gas mixture in various processes that would exhibit characteristics of fast fill, fast follow and fast freeze type of metal deposition during the welding process. Gas mixtures of carbon dioxide, oxygen and argon were known that would have the characteristics of fast fill and fast follow. However, these gas mixtures were not as efficient in fast freeze type welding application. Furthermore, for flux cored arc welding processes, the percentage of argon was, for all practical purposes, limited to 75%.

satisfactory results. After an initial round of testing the preferred composition was adjusted to contain 68% argon, 20% helium and 12% carbon dioxide by volume.

The mixture of 68% argon, 20% helium and 12% carbon dioxide by volume was tested using various processes and various welding conditions. The results are set forth in Table 1 below.

TABLE 1

| Sample | Welding Process (1) | Transfer Type | Weld Type | Position | Wire Size (in) | Plate Thickness (in) | Amperes/ Voltage | Weld Appearance | Wetting | Weld Presentation | Root Fusion |
|---|---|---|---|---|---|---|---|---|---|---|---|
| 1) | GMAW | Spray | Filet | Horizontal | 0.035 | 0.375 | 230/29 | VG* | VG* | VG* | VG* |
| 2) | GMAW | Spray | Filet | Horizontal | 0.045 | 0.375 | 280/50 | FLAT/SHINY | VG* | VG* | VG* |
| 3) | GMAW | Spray | Filet | Horizontal | 0.035 | 0.375 | 220/28.5–29 | FLAT/SHINY | VS** | VG* | VG* |
| 4) | GMAW | Other[2] | Filet | Down | 0.035 | 0.1875 | 275/22 | FLAT/SHINY | VS** | VG* | VG* |
| 5) | GMAW | Short Circuit | Butt | (3) | 0.375 | 0.375 | 160 & 130/16–17 | FLAT/SHINY | VS** | VS* | VG* |
| 6) | GMAW | Short Circuit | Filet | Horizontal | 0.035 | 0.125[4] | 180/18.5 | VS** | VG | VG | VG |
| 7) | GMAW | Short Circuit | Filet | Horizontal | 0.015 | 0.125[5] | 180/18 | VS** | VS | VG | VG |
| 8) | GMAW | Short Circuit | Filet | Horizontal | 0.035 | 0.125[6] | 180/18.5 | VS | VG | VG | VG |
| 9) | GMAW | Short Circuit | Filet | Horizontal | 0.023 | (7) | 55–60/12–13 | SHINY & CLEAN | VG | VG | VG |
| 10) | GMAW | Short Circuit | Filet | Horizontal | 0.030 | 0.125 | 90–110/15–16 | VG | VG | VG | VG |
| 11) | GMAW | Short Circuit | Filet | Horizontal | 0.030 | 0.125 | 110–120/116–17 | EXCELLENT | VG | VG | VG |
| 12) | CCAW | Spray | Filet | Horizontal | 0.052 | 0.375 | 290.27.8 | SMOOTH | VGI | VG | VG |
| 13) | CCAW | Other[2] | Filet | Vertical-Up | 0.052 | 0.025 | 250/23 | FLAT, CLEAN, FREE SPATTER | GOOD | VG | VG |
| 14) | FCAW | Spray | Filet | Horizontal | 0.052 | 0.500 | 290–300/27.8–28.5 | SMOOTH | VG EXCELLENT | VG | VG |
| 15) | CCAW | Spray | Filet | Horizontal | 0.052 | 0.375–0.50 | 230/23 | CLEAN FINISH | GOOD | GOOD | GOOD |
| 16) | CCAW | Spray | Filet | Horizontal | 0.052 | 0.500 | 250/22–23 | CLEAN | FLAT FILET | GOOD | GOOD |
| 17) | CCAW | Spray | Filet | Horizontal | 0.052 | 0.750 | 250/23–24 | CLEAN-SPATTER | VERY FLAT | VG | VG |

(1) GMAW = Gas Metal Arc Welding CCAW = Composite Cored Arc Welding FCAW = Flux Cored Arc Welding
*Very Good **Very Smooth
[2]Other than short circuit, spray transfer or pulsed spray transfer
[3]First pass down second and third passes up
[4]Galvanized Mild Steel Plate
[5]Galvanized Mild Steel Plate to painted metal
[6]Galvanized Mild Steel Plate to rust coated metal
[7]16 Gage Therefore, it became necessary to create a shielding gas mixture which would have the three aforementioned characteristics when used in gas metal arc welding for both low carbon and mild steels, which would also work for flux cored wire arc welding, and composite cored arc welding and meet the applicable standards of the various governmental agencies.

Various trials have led to the discovery that a shielding gas mixture having a nominal composition of 68% argon, 20% helium and 12% carbon dioxide by volume would provide excellent results for all three characteristics noted above when the shielding gas is used for gas metal arc welding, flux cored arc welding, and cored arc welding processes.

The present invention encompasses shielding gas mixtures wherein the composition consists essentially of 62–74% by volume argon, 17–23% by volume helium, and 9–16% by volume carbon dioxide. The various components can be adjusted to accommodate different welding conditions as needed for gas metal arc, flux cored wire, or composite cored arc welding applications.

In a first attempt a mixture consisting essentially of 67% argon, 20% helium and 13% carbon dioxide was used with From the foregoing table it is apparent that the preferred composition according to the present invention accomplishes a single gas mixture for highly efficient welding processes, namely, gas metal arc welding, composite cored arc welding and flux cored arc welding. This shielding gas according to the present invention provides for transfer of the metal by the various metal transfer techniques and permits multi-position and multi-process welding by the user. In addition, the shielding gas mixture achieves greater penetration in short circuit and axial spray transfer. Furthermore, the shielding gas mixtures according to the present invention decrease the lack of fusion when used in the metal inert gas welding (MIG) welding process.

Furthermore, in the tests reported in Table 1, all of the samples were found to be very appealing to the weld operator, provide easily handling by the operator and provide easy setup by the operator.

An additional series of tests were run by prospective users of the shielding gas and processes. Twenty six samples were welded; 16 using the preferred composition in gas metal arc welding, 6 using the preferred composition in flux cored arc welding, and 4 using the preferred composition in composite cored arc welding. The users rated the weld appearance, wetting of the weld, weld penetration, operator appeal, ease of manipulation, and ease of set-up using the preferred composition in the enumerated processes. In all 26 samples the results of the evaluation by skilled welders was that they concluded the single preferred composition according to the invention was as good as or better, when used in three distinct processes, than the several shielding gas mixtures required previously. Thus the goal of the invention to provide a single shielding gas composition that can be used in GMAW, FCAW, or CCAW has been accomplished.

The preferred composition according to the present invention reduces the number of shielding gases or gas mixtures required by the user, thus decreasing the number of cylinders that an end user needs to have in stock, and, therfore increases the performance capability for the user.

For the manufacturer of the shielding gas mixture there are similar decreases in the number of cylinders required with a corresponding increase in the manufacturers transfill plant efficiency.

The compositions and the preferred composition according to the present invention are also environmentally friendly since they decrease the quantity of carbon dioxide released into the atmosphere, as compared to known gas mixtures used for these processes.

Having thus described our invention what is desired to be secured by Letters Patent is set forth in the appended claims.

What is claimed is:

1. In a flux cored arc welding process wherein an arc is maintained between a continuous filler metal electrode consisting essentially of a metal enclosing fluxing materials and a weld pool the improvement comprising:

shielding said arc with a gas mixture consisting essentially of 68% by volume argon, 20% by volume helium and 12% by volume carbon dioxide.

2. In composite cored arc welding process wherein an arc is maintained between a welding electrode and a base metal the improvement comprising shielding said arc with a gas mixture consisting essentially of 68% by volume argon, 20% by volume helium and 12% by volume carbon dioxide.

3. A process according to claim 2 wherein said electrode is supplied as a continuous wire.

* * * * *

UNITED STATES PATENT AND TRADEMARK OFFICE
CERTIFICATE OF CORRECTION

PATENT NO.   : 6,274,838 B1
DATED        : August 14, 2001
INVENTOR(S)  : Claude Raymond Demers et al.

Page 1 of 1

It is certified that error appears in the above-identified patent and that said Letters Patent is hereby corrected as shown below:

<u>Column 3 and 4, Table 1,</u>
Line 5, under "Wire Size" delete the numeral "0.375" and substitute therefor -- 0.035 --.
Line 7, under "Wire Size" delete the numeral "0.015" and substitute therefor -- 0.035 --.
Line 8, under "Weld Type" delete the word "Filet" and substitute therefor -- Butt --.
Line 11, under "Amperes/Voltage" delete the numeral "110-120/116-17" and substitute therefor -- 110-120/16-17 --.
Line 17, under "Weld Apperance" delete "CLEAN-SPATTER" and substiute therefor -- CLEAN-SPATTER FREE --.
Line 17 under "Wetting" delete "VERY FLAT" and substitute therefor -- VERY FLAT FLEET --.

Signed and Sealed this

Twenty-eighth Day of May, 2002

Attest:

JAMES E. ROGAN
*Director of the United States Patent and Trademark Office*

*Attesting Officer*